United States Patent [19]

Shirata et al.

[11] Patent Number: 5,321,629
[45] Date of Patent: Jun. 14, 1994

[54] FACILITY INSPECTION SUPPORT APPARATUS

[75] Inventors: Shigenobu Shirata, Kodaira; Kensuke Kawai; Miyako Negishi, both of Tokorozawa; Toshio Fujiwara, Inagi, all of Japan

[73] Assignee: Kabushiki Kaisha Toshiba, Kawasaki, Japan

[21] Appl. No.: 761,346

[22] PCT Filed: Jan. 11, 1991

[86] PCT No.: PCT/JP91/00016

§ 371 Date: Sep. 10, 1991

§ 102(e) Date: Sep. 10, 1991

[87] PCT Pub. No.: WO91/10881

PCT Pub. Date: Jul. 25, 1991

[30] Foreign Application Priority Data

Jan. 11, 1990 [JP] Japan ................................ 2-2478
May 22, 1990 [JP] Japan ............................ 2-130253

[51] Int. Cl.$^5$ .............................................. G01B 7/00
[52] U.S. Cl. .............................. 364/551.01; 364/550;
364/709.09; 364/709.12; 340/825.69;
340/825.72; 340/825.54; 340/825.55
[58] Field of Search .................... 364/900, 550, 551.01,
364/551.02, 140, 142, 709.01, 709.09, 709.12,
709.16; 340/825., 69, 825.72, 825.54, 825.55,
825.17

[56] References Cited

U.S. PATENT DOCUMENTS

| | | | |
|---|---|---|---|
| 4,090,247 | 5/1978 | Martin | 364/900 |
| 4,542,472 | 9/1985 | Toms, II | 364/550 |
| 4,815,014 | 3/1989 | Lipner et al. | 364/550 |
| 5,081,598 | 1/1992 | Bellows et al. | 364/550 |
| 5,136,285 | 8/1992 | Okuyama | 364/550 |

OTHER PUBLICATIONS

Ingo Hackel, "Easy Drive and Converting Servicing via User-Friendly Diagnostics: Simadyn D", Siemens Power Engineering & Automation, May 1986, vol. 8, No. 3, pp. 184-186.

Hitachi Seisakusho K.K., "Inspecting Device With Operation Indicating Function", Patent Abstarct of Japan, Apri. 1984, vol. 8, No. 169, p. 292.

Hitachi Seisakusho K.K., "Device For Instructing Checking Work", Patent Abstracts of Japan, Apr. 1983, vol. 7, No. 164, p. 211.

Primary Examiner—Jack B. Harvey
Assistant Examiner—Hal D. Wachsman
Attorney, Agent, or Firm—Foley & Lardner

[57] ABSTRACT

A facility inspection support apparatus having portable terminal equipment (2) for collecting on the field basis a patrol inspection result at each site of plant facilities, and a processor (1) for receiving the patrol inspection result data collected by the portable terminal equipment and performing a necessary data process. The processor (1) includes a data base (11) for storing in advance a plurality of patrol inspection routes, and discrimination information of patrol inspection items included in the inspection routes, and storing the patrol inspection result data collected by the portable terminal equipment, and facility management processor (15) for deriving the discrimination information of a patrol inspection item designated by the interactive apparatus and a past patrol inspection result data for the designated patrol inspection item, out of the data base, and transferring the discrimination information and the past patrol inspection result data to the portable terminal equipment (2). The portable terminal equipment (2) includes a data memory (23) for storing the collected patrol inspection result data, and a display device (26) for sequentially displaying the discrimination information of patrol inspection items and the past patrol inspection result data sent from the processor in the order following the patrol inspection route.

12 Claims, 20 Drawing Sheets

FIG. 7A

```
A COURSE 002   385370      GOOD
       TURBINE BEARING OIL CONDITION ?

1. × × × ×    2. × × × ×
       SELECT NUMBER
```

FIG. 7B

```
A COURSE 002   385370
   1. OFFENSIVE      4. COLOR CHANGE
      SMELL
   2. FOAM           5. LEAK
   3. SUPPLY OIL     6. CONTAMINATED
       SELECT NUMBER
```

FIG. 7C

```
NO.  002      385370
   1. CLOGGED        4. EQUIPPING
   2. ADHERED        5. CLEANING
   3. FLOATED        6. OTHERS
       SELECT NUMBER
```

FIG. 7D

```
A COURSE 002   385370
   1. IMMEDIATE ACTION
   2. ACTION AFTER INSPECTIONS
   3. WAIT UNTIL NEXT INSPECTIONS
       SELECT NUMBER
```

FIG. 10

PATROL RESULT LIST          [XX-8-30-10:32] — R5
       R2  R3      R6                              R4    R1
[XX Y08M30D]
PATROL COURSE [A]                  PERSON IN CHARGE [X00001]
LOAD [500 - 600MW]

| NO | NAME | UNIT | PRESENT VALUE | LIMIT VALUE /DEGREE | JUDGMENT | TAGNO | TIME |
|---|---|---|---|---|---|---|---|
| 001 | TURBINE MAIN SHAFT PUMP DELIVERY PRESSURE | KG/(M) | 14. | 12. - 16 | O | IT101 | 10:19 |
| 008 | TURBINE BEARING OIL STATUS? | O/X | CONTAMINATED | | SMALL | IT108 | 10:21 |
| 006 | TURBINE BEARING OIL INLET TEMPERATURE | °C | 45. | 43. - 49. | O | IT106 | 10:23 |
| 007 | TURBINE BEARING OIL OUTLET TEMPERATURE | °C | 62 | 63. - 69. | X | IT107 | 10:24 |
| 002 | EMERGENCY TRIP DEVICE LOCK-OUT LAMP? | O/X | O | | O | IT102 | 10:26 |
| 003 | EMERGENCY TRIP DEVICE RESETTING LAMP? | O/X | O | | O | IT103 | 10:26 |
| 004 | EMERGENCY TRIP DEVICE RESET LAMP? | O/X | O | | O | IT104 | 10:26 |
| 005 | EMERGENCY TRIP DEVICE TRIP LAMP? | O/X | O | | O | IT105 | 10:26 |
| 009 | INITIAL PRESSURE REGULATOR INDICATED POSITION :OFF? | O/X | PASS | | | IT109 | 10:27 |
| 012 | VACUUM TRIP DEVICE? | O/X | O | | O | IT112 | 10:28 |

PF1:NEXT PAGE   PF2:PREVIOUS PAGE   PF3:PRINT                    PF6:END

| ITEM | LOAD | FUEL | MAIN STEAM PRESSURE | MAIN STEAM TEMPERATURE | REHEAT STEAM TEMPERATURE | AH OUTLET GAS TEMPERATURE | AH INLET GAS TEMPERATURE | NOx (4% CONVER-SION) | ECO OUTLET GAS O$_2$ | CONDENSER VACUUM PRESSURE | ATMOSPHERE PRESSURE | SEA WATER TEMPERATURE |
|---|---|---|---|---|---|---|---|---|---|---|---|---|
| UNIT | MW | T/H | ATG | °C | °C | °C | °C | PPM | % | mmHg | °C | °C |
| SECOND PREVIOUS xxYxMxD | xxx | xxxx | xxx | xxx | xxx | xxx | xxx | xxx | xxx | xxx | xxxx | xxx |
| PREVIOUS xxYxMxD | xxx | xxx | xxx | xxx | xxx | xxx | xxx | xxx | xxx | xxxx | xxxxxx | xxx |
| PRESENT xxYxMxD | xxx | xxx | xxx | xxx | xxx | xxx | xxx | xxx | xxx | xxxxx | xxxxxx | xxx |
| NOTE | | | | | | | | | | | | |

FIG. 11

| ITEM ID | ITEM NAME | INSPECTION APPARATUS NO. | EVENT PARAMETER & IMPORTANCE FACTOR ||||||
|---|---|---|---|---|---|---|---|---|
| | | | UNIT ACTIVATION || MTS || MFT ||
| | | | PATROL LEVEL | SKILL FACTOR | PATROL LEVEL | SKILL FACTOR | PATROL LEVEL | SKILL FACTOR |
| T001 | CENTRAL OPERATION ROOM MAIN TURBINE SYSTEM ANN TURNING-ON CONDITION CHECK | 1 | NUL | NUL | 2 | 1 | NUL | NUL |
| T002 | TURBINE PROTECTIVE RELAY PANEL STATUS | 3 | NUL | NUL | 1 | 1 | 1 | 1 |
| T003 | EHC CONTROL APPARATUS ALARM STATUS | 2 | NUL | NUL | 3 | 2 | NUL | NUL |
| T004 | TURBINE TOP DISPLAY STATUS | 4 | NUL | NUL | 1 | 1 | 1 | |

| INSPECTION APPARATUS NO. | INSPECTION APPARATUS INSTALLING BUILDING NO. | INSPECTION APPARATUS INSTALLING FLOOR | INSPECTION APPARATUS INSTALLING ROOM | INSPECTION APPARATUS INSTALLING POSITION |
|---|---|---|---|---|
| 1 | 1 | 3F | CENTRAL OPERATION ROOM | BTG PANEL |
| 2 | 1 | 3F | CONTROL APPARATUS ROOM | EHC CONTROL APPARATUS |
| 3 | 1 | 3F | CONTROL APPARATUS ROOM | TURBINE PROTECTIVE RELAY PANEL |

41a

FACILITY INSPECTION SUPPORT APPARATUS

TECHNICAL FIELD

The present invention relates to a facility inspection support apparatus for supporting to reduce the manpower patrolling field inspections of various plant facilities such as a power plant.

RELATED BACKGROUND ART

In a thermal power plant, for example, a computer is used for operating and monitoring the plant. Various process status values at various plant facilities are converted into electrical signals such as analog signals, digital signals, and pulse signals, and supplied to the computer.

There are other process status values necessary for the management of facilities of the thermal power plant, although they are not supplied to the computer.

The latter process status values are monitored by a maintenance engineer while making a patrol for inspecting the facilities. The inspection results are recorded on an inspection report for the management of facilities. For the purpose of such management, a regular inspection and a patrol inspection of plant facilities is also carried out.

Such conventional inspection jobs are mainly carried out manually, resulting in a very long job time.

Although inspection routes are predetermined so as to prevent the inspection of any one of plant facilities from being missed, a maintenance engineer is required to memorize all inspection routes. Usually a maintenance engineer holds in his hand an inspection sheet on which inspection routes are written so that every facility is inspected while referring to the sheet. This imposes some burden on the maintenance engineer.

A patrol inspection job for such a power plant includes: patrol inspection jobs generally regularly executed; precise inspection jobs for inspecting the plant status more precisely; and patrol inspection jobs regularly executed for recording the status of apparatuses installed for the maintenance and management of a plant. There are other inspection jobs executed irregularly in accordance with the state of a plant, such as inspection jobs executed at the start of operating a plant, and inspection jobs executed upon occurrence of an abnormal state of a plant. The number of patrol inspection courses for both types of patrol inspection jobs becomes extremely large. Furthermore, since inspection items for irregular patrol inspection jobs are determined on the basis of the object of each job, there are various combinations of inspection items. Therefore, preparing patrol inspection courses for such a variety of inspection jobs and items results in a great amount of job, time and labor.

While an inspection job is actually executed at each field after setting the inspection courses, a maintenance engineer cannot be informed of a standard value for judging if a plant status quantity for an inspection item is normal or not, or of a value obtained at the previous inspection. Therefore, it is difficult for the maintenance engineer to properly judge, for example, if the inspected plant status quantity is normal or not, or if the defect found at the previous inspection has been recovered or not.

SUMMARY OF THE INVENTION

It is an object of the present invention to provide a facility inspection support apparatus capable of solving the above-described prior art disadvantages and executing inspections of plant facilities in a rational way.

It is a further object of the present invention to provide a facility inspection support apparatus capable of deriving an optimum inspection item for a given object of patrol inspection and for automatically setting an efficient patrol inspection route.

According to a first aspect of the present invention, there is provided a facility inspection support apparatus comprising a portable terminal equipment for collecting on the field basis a patrol inspection result data at each site of plant facilities, a processor for receiving the patrol inspection result data collected by the portable terminal equipment and performing a necessary data process, and an interactive apparatus for displaying, upon request, the patrol inspection result data processed by the processor, and for interactively selecting a necessary patrol inspection route from a predetermined plurality of patrol inspection routes, the processor including data base means for storing in advance the predetermined plurality of patrol inspection routes, and discrimination information of patrol inspection items included in the inspection routes, and storing the patrol inspection result data collected by the portable terminal equipment, and facility management processing means for deriving the discrimination information of a patrol inspection item designated by the interactive apparatus and a past patrol inspection result data for the designated patrol inspection item, out of the data base means, and transferring the discrimination information and the past patrol inspection result data to the portable terminal equipment, a portable terminal equipment including a data memory for storing the collected patrol inspection result data, and a display device for sequentially displaying the discrimination information of patrol inspection items and the past patrol inspection result data transferred from the processor in the order following the patrol inspection route.

According to the present invention, inspection data is collected using the portable terminal equipment. Therefore, the amount of work by a maintenance engineer required for plant inspection can be reduced considerably, thus reducing the burden on the maintenance engineer. Furthermore, the data base is configured using inspection data and managed collectively. Therefore, it is possible to detect an abnormal state at an earlier stage while referring to past history, and easily form various types of management reports in an effective format.

According to a second aspect of the present invention there is provided a facility inspection support apparatus comprising a portable terminal equipment for collecting on the field basis the patrol inspection result data at each site of plant facilities, and a processor for receiving the patrol inspection result data collected by the portable terminal equipment and determining an optimum patrol inspection course from a predetermined plurality of patrol inspection courses, the processor including means for setting a patrol inspection condition, means for deriving an object patrol inspection item from a patrol inspection item file in accordance with the set patrol inspection condition, means for editing the derived patrol inspection item to an optimum patrol inspection course satisfying a patrol object and storing the optimum patrol inspection course in a patrol inspection course storage file, means for storing the patrol inspection result data received from the portable terminal equipment in a patrol inspection result history file, and means for displaying the stored patrol inspection result data, and the portable terminal equipment including means for receiving patrol inspection course information sent from the processor, means for sequentially displaying the received patrol inspection item, means for inputting a patrol inspection data regarding the displayed patrol inspection item, and means for transmitting the inputted patrol inspection result data to the processor.

In the facility inspection support apparatus according to the second aspect, in accordance with a patrol inspection condition such as a patrol object set by the patrol inspection condition setting means, the patrol inspection item deriving means derives an object patrol inspection item from the patrol inspection item file. In accordance with the condition such as a patrol inspection method set by the patrol inspection condition setting means, the patrol inspection course editing means obtains a condition for executing an inspection job within a shortest time period from the patrol inspection apparatus information file. In accordance with the obtained condition, the patrol inspection course editing means edits the patrol inspection item derived by the patrol inspection item deriving means to an optimum patrol course (patrol route), the result being set in the patrol inspection course storage file. The patrol inspection course transmission means transmits as the patrol inspection information the edited patrol inspection item to the portable terminal equipment via the communication device. The reception means receives the patrol item sent from the processor. The display means displays the received patrol inspection item. The input means performs an inspection job in accordance with the patrol inspection item displayed on the display means, and enters the inspection results.

When the inspection job is completed for all patrol inspection items, the transmission means transmits the patrol inspection result data to the processor via the transfer device. The reception means receives the patrol inspection result data sent from the portable terminal equipment and supplies it to the patrol inspection data storage means. The patrol inspection data storage means causes the received inspection result data to be stored in the patrol inspection result history file as the inspection history. In storing the data, not only the inspection result data but also the patrol inspection condition and the like are stored so as to facilitate data retrieval. The display means displays a list of inspection results using the contents of the patrol inspection result history file, a historical graph indicating a change tendency at patrol points using past history data, or a correlation graph to be used for checking the correlation.

In this manner, upon selectively entering a patrol inspection condition, it is possible to set an optimum patrol inspection course suitable for the patrol inspection condition while referring to a combination of arbitrary patrol inspection items.

BRIEF DESCRIPTION OF THE DRAWINGS

In the accompanying drawings:

FIGS. 7A to 7D are diagrams showing examples of display images on the portable terminal equipment during the inspection period;

FIG. 10 shows an example of a display image indicating inspection results;

FIG. 11 is an example of a report indicating inspection results;

FIG. 17 shows an example of a patrol inspection file;

FIGS. 18A to 18C show examples of patrol inspection apparatus files; and

EMBODIMENTS OF THE INVENTION

Figure 1:
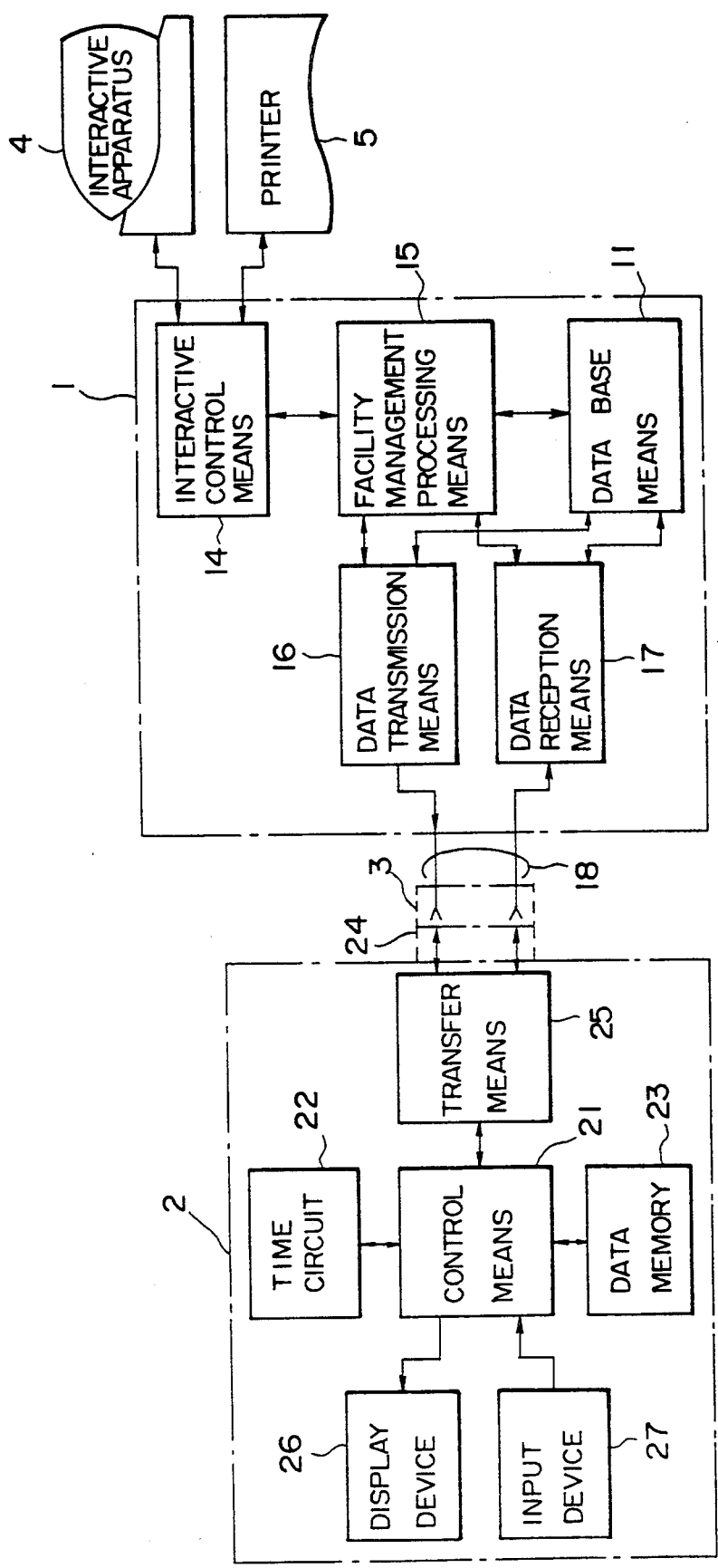
FIG. 1 is a block diagram showing a facility inspection support apparatus according to an embodiment of the present invention.
Figure 2:
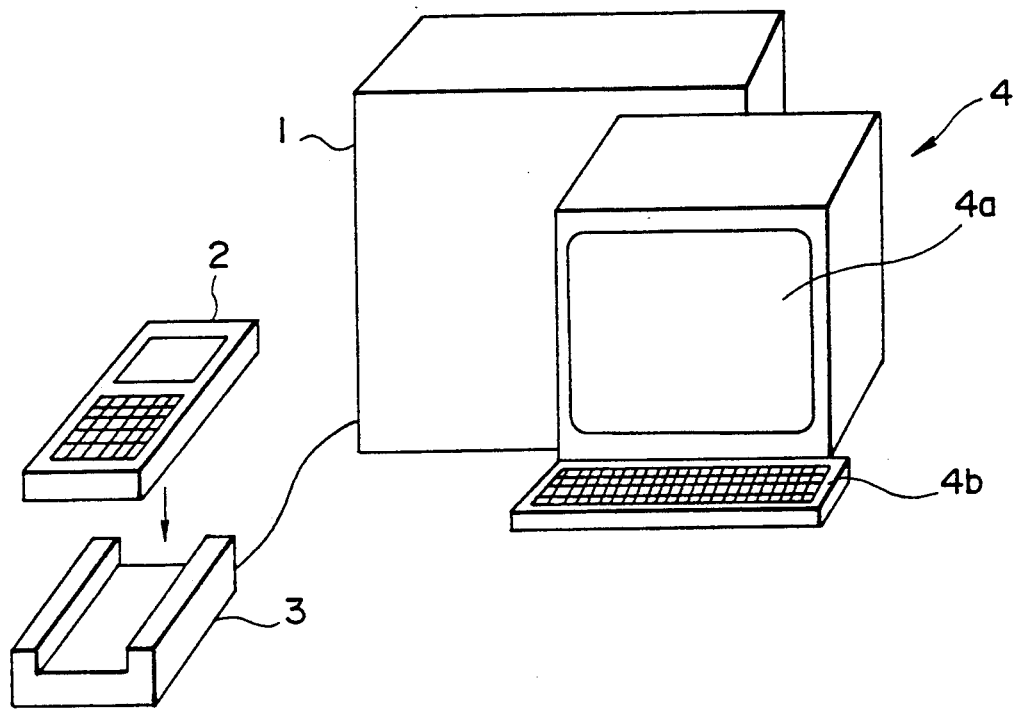
FIG. 2 shows the hardware structure of the apparatus shown in FIG. 1.

As shown in FIGS. 1 and 2, a facility inspection support apparatus is constructed of a processor 1 for processing facility inspection and management data, a portable terminal equipment 2 held by a maintenance engineer on an inspection route for entering an inspection status data and abnormal state data for an inspection item, and a communication device 3 for communicating the processor 1 and the portable terminal equipment 2. The processor 1 may use a personal computer J3300 or J3100 manufactured by TOSHIBA CORP. The portable terminal equipment 2 may use a handy terminal PT2000 manufactured by TOSHIBA CORP. The processor 1 is equipped with an interactive apparatus 4 which has a display device 4a for displaying information such as, an inspection result report and a keyboard 4b for entering various numerals and commands. The processor 1 is also equipped with a printer 5 for printing out the inspection result report or the like.

Figure 3:
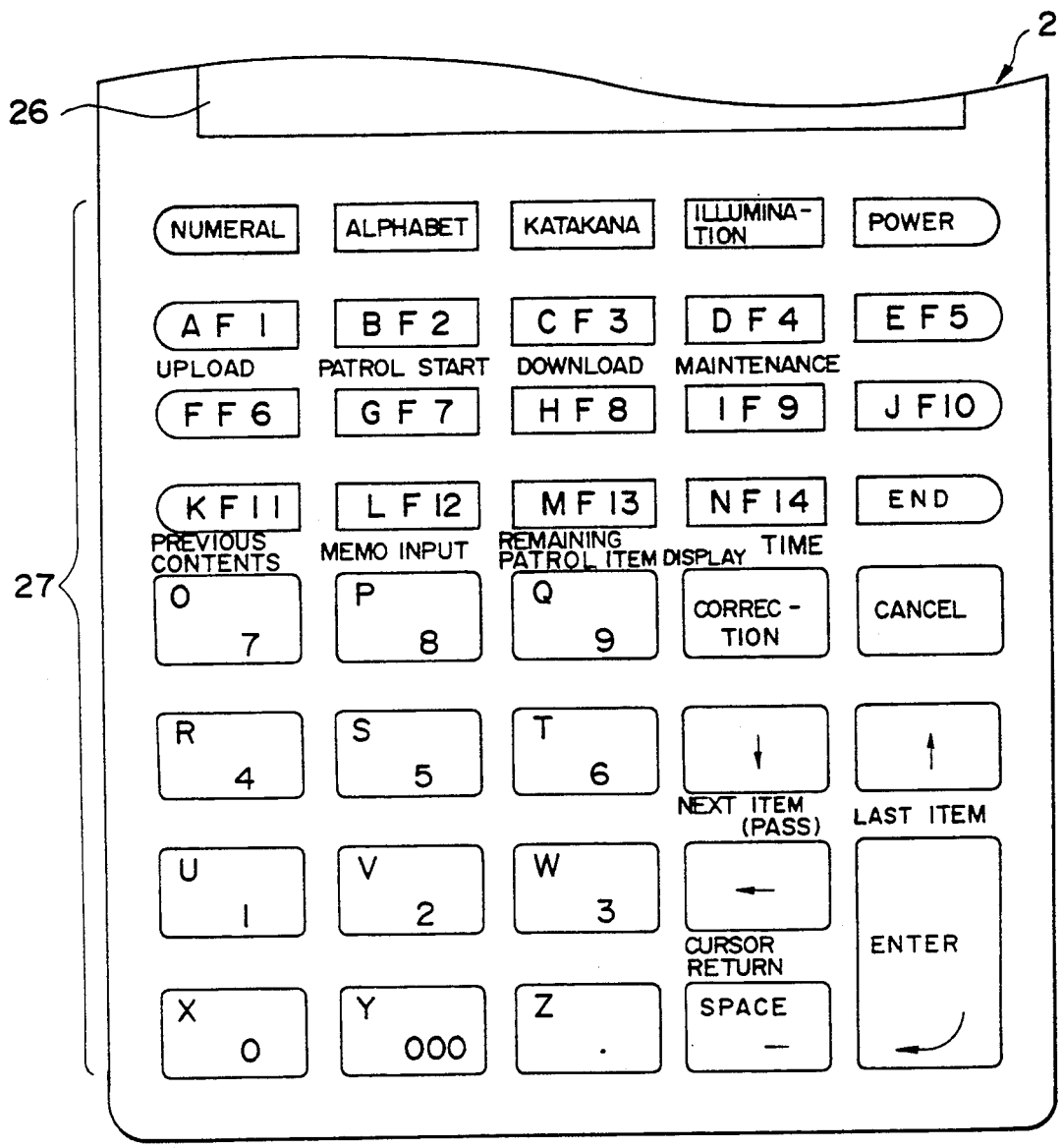
FIG. 3 is a plan view of a portable terminal equipment of the apparatus shown in FIG. 1.

As shown in FIG. 3, the portable terminal equipment 2 has an input device 27 made of various function keys and numerical keys, and a liquid crystal display device 26 for displaying necessary data. The portable terminal equipment 2 has also a buzzer (not shown) for generating an alarm sound during the abnormal state.

Next, a facility management processing means 15 in processor 1 transfers data to and from the portable terminal equipment 2 via a data transmission means 16 and a data reception means 17, and interactively processes data between the interactive apparatus 4 and printer 5 via an interactive control means 14. The facility management processing means 15 also issues a command to the data base means 11 to read and write data necessary for the data transfer and interactive control.

The data base means 11 of the processor 1 is constructed of, e.g., a magnetic disc unit or an optical disk unit. The data base means 11 stores in advance the inspection items for a predetermined plurality of inspection courses and the limit values of inspection status quantities for each inspection item. The data base means 11 stores for each inspection job the value of each inspection status quantity for each inspection item of a plant facility inputted from the portable terminal equipment 2 via the data reception means 17. As described above, the data base means 11 stores all types of data for each inspection item for a plant facility. When a maintenance engineer wants to check the inspected data, necessary data can be displayed on the interactive apparatus 4 or printed out by the printer 5.

The data transmission means 16 and data reception means 17 are connected to the communication device 3 via a cable 18. The communication device 3 can be detachably mounted to a connection unit 24 of the portable terminal equipment 2. Therefore, processor 1 can be connected to the portable terminal equipment 2 as desired.

Next, control means 21 located in the portable terminal equipment 2 controls the operation of the portable terminal equipment 2. The control means 21 stores the data representative of an inspection status quantity entered from the input device 27, together with a current time data from a timer circuit 22, in a data memory 23. The data memory 23 stores the inspection status quantity and data input time, as well as various data to be described later.

The connection unit 24 is connected to the communication device 3 so that the portable terminal equipment 2 is coupled to the processor 1 at the start and end of inspection. A transfer means 25 transfers data to and from the processor 1 connected to the portable terminal equipment 2.

The display device 26 is constructed of a liquid crystal display unit for displaying various messages. The input device 27 is used for entering data using the above-described various keys.

Figure 4:
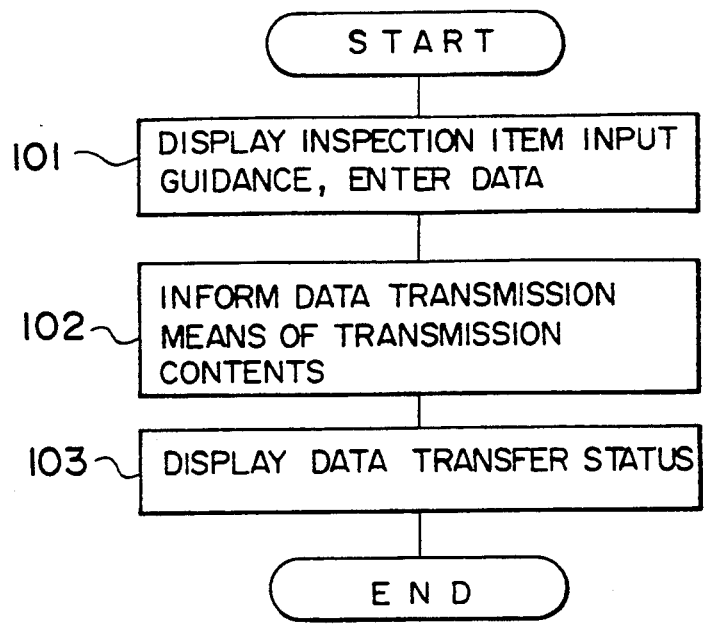
FIG. 4 is a flow chart illustrating an example of the procedure to be executed during an inspection stand-by period.

With the facility inspection support apparatus constructed as above, a stand-by operation is executed before starting an inspection job in accordance with the procedure shown in FIG. 4.

Figure 5:
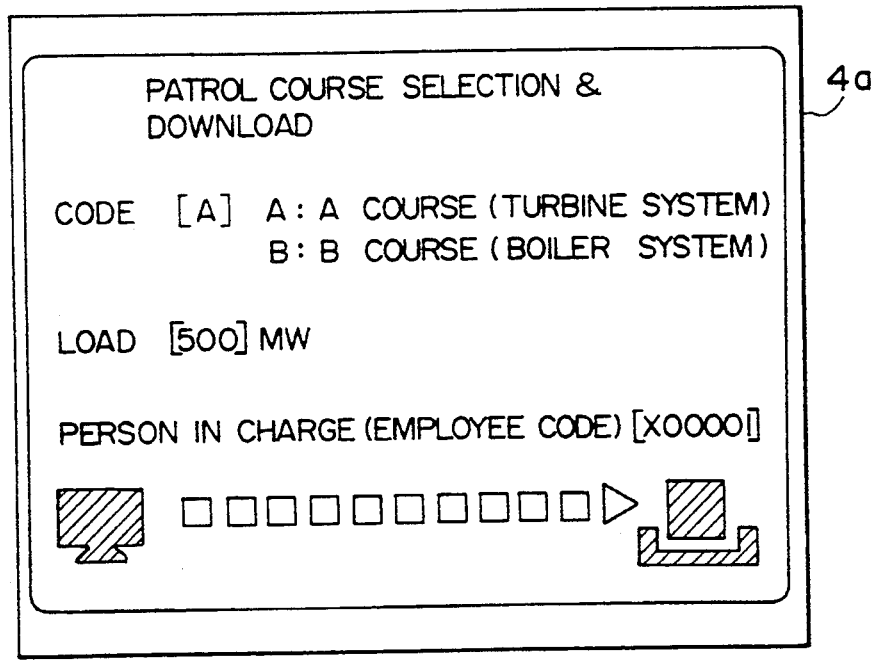
FIG. 5 shows an example of a display image on an interactive equipment during the inspection stand-by period.

Specifically, a maintenance engineer enters an inspection stand-by command from the interactive apparatus 4 while mounting the portable terminal equipment 2 to the communication device 3. This command is supplied via the interactive control means 14 to the facility management processing means 15. The facility management processing means 15 operates to display a guidance menu on the interactive apparatus 4 (step 101), the guidance menu including necessary data for the maintenance engineer to enter an inspection item from the interactive apparatus 4. For example, a guidance menu such as shown in FIG. 5 is displayed so that a maintenance engineer can select an inspection route (patrol course) and enter the load of a plant such as a thermal power plant, and the identification data of the maintenance engineer. The reason why the load of a plant such as a thermal power plant is entered is that the limit values of inspection status quantities may vary with the load.

Upon input of the inspection route, load value, and maintenance engineer identification code, the facility management processing means 15 supplies the inputted data and current time data to the data transmission means 16 and causes to start inspection item data to the portable terminal equipment 2 (step 102). More specifically, the data transmission means 16 transmits to the portable terminal equipment 2 the judgment data for each inspection status quantity at each inspection field on the inspection route, previous inspection status quantity, and limit value, respectively read from the data base means 11, together with the entered inspection route, load value, maintenance engineer identification code, and current time data.

The operation of such data transmission is displayed on the display device 4a of the interactive apparatus 4 (step 103, refer to the lower portion on the guidance menu shown in FIG. 5). Therefore, the maintenance engineer identification can be properly informed of the data transmission state to the portable terminal equipment 2.

Upon receipt of the data necessary for inspection from the processor 1, the portable terminal equipment 2 stores the data together with a current time data from the time circuit 22 in the data memory 23 by using the transfer means 25 and control means 21.

Figure 6:
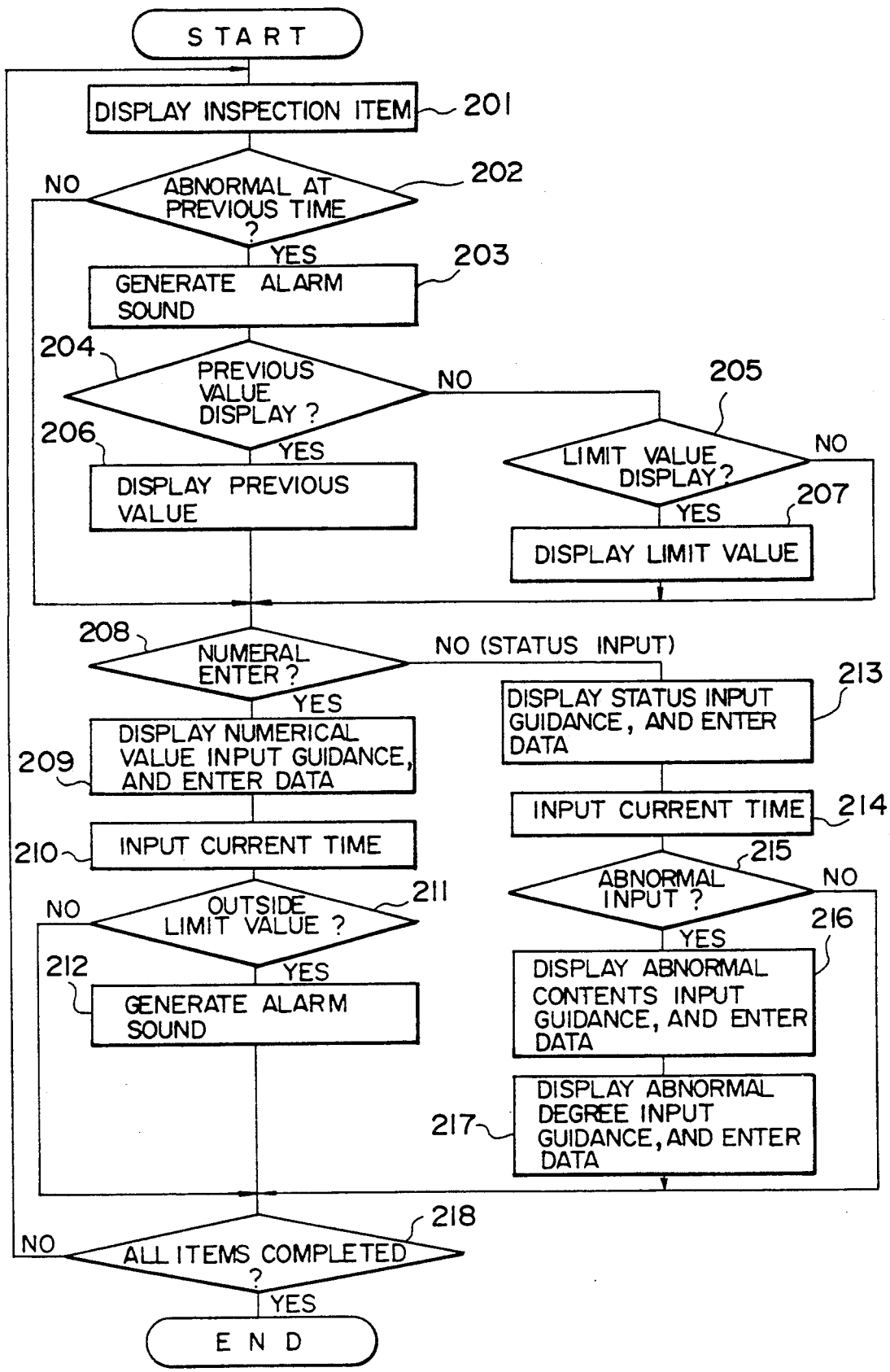
FIG. 6 is a flow chart illustrating an example of the procedure during an inspection period to be executed by the portable terminal equipment.

The control means 21 of the portable terminal equipment 2 executes the procedure shown in FIG. 6. Namely, the maintenance engineer enters a process status quantity for each inspection item.

First, the inspection item for a first inspection field on the inspection route where inspection is not still performed, is displayed on the liquid crystal display device 26 (step 201). Then, it is checked if the previous process status quantity for the inspection item indicated an abnormal state or not (step 202). If the previous value is abnormal, an alarm sound is generated to the effect that the inspection at this time should be carefully made (step 203).

If the maintenance engineer enters a command to display the previous inspection value or limit value, such a value is displayed on the liquid crystal display device 26 (steps 204, 205, 206, and 207). In this manner the maintenance engineer can be informed of the previous inspection value or limit value for an inspection item, ensuring a proper judgment by the maintenance engineer.

In entering the current inspection value for the inspection item, it is first checked if the process status quantity for the inspection item is entered as numerals or as status itself (step 208). In the case of numeric input, a numeric input guidance menu is displayed to urge the maintenance engineer to input numeric data, the inputted data being stored as the current value for the inspection item (step 209), and the current time data from the time circuit 22 being stored in association with the current value (step 210).

If the current value does not satisfy the limit value (YES at judgment step 211), an alarm sound to such effect is generated (step 212).

In the case of status input, a status input guidance menu is displayed to urge the maintenance engineer to enter status data for the inspection item, the inputted status data being stored as the current value for the inspection item (step 213), and the current time data from the time circuit 22 being stored in association with the current value (step 214).

If the current value indicates an abnormal input (YES at judgment step 215), the abnormal state contents in the form of list are displayed to urge the maintenance engineer to select the corresponding abnormal input (step 217). For example, the abnormal state contents include "Offensive Smell", "Foam Generation", "Oil Shortage", "Color Change", and the like, and the abnormal state degree includes "Immediate Action", "Action after Inspections", "Wait until Next Inspections", and the like.

The data input for each inspection item as described above is repeated for all necessary inspection items (NO loop at judgment step 218).

For example, as shown in FIG. 7A, for the inspection of a turbine bearing oil condition, the inspection item contents "Turbine Bearing Oil Condition" are displayed on the liquid crystal display device 26 for urging the maintenance engineer to select one of two conditions displayed for two items.

If an abnormal state is selected and entered, the two frames shown in FIG. 7B and 7C are displayed one after the other for urging the maintenance engineer to enter the present abnormal state.

Upon entering the abnormal state, a menu shown in FIG. 7D is displayed for urging the maintenance engineer to select the abnormal state degree.

After inputting data for all inspection items, the similar procedure is repeated at the next inspection item on the selected inspection route.

In this manner, data is inputted for all inspection items on the inspection route in accordance with a display image on the liquid crystal display device 26. Thereafter, the maintenance engineer mounts the portable terminal equipment 2 on the communication device 3 and instructs the processor 1 to read the inspection data using the interactive apparatus 4.

Figure 8:
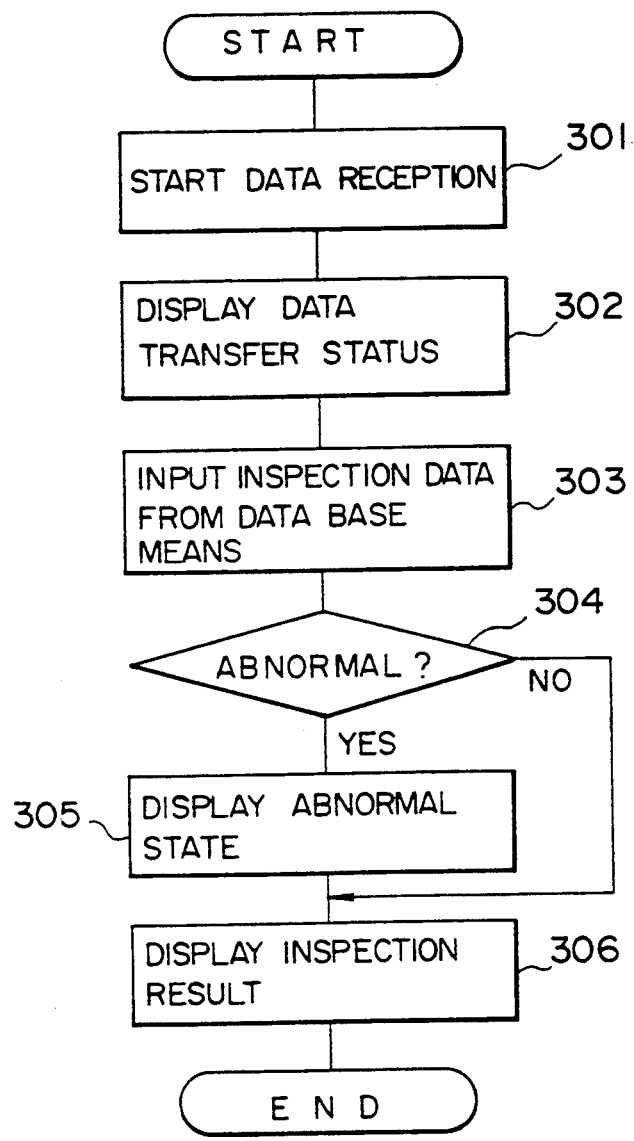
FIG. 8 is a flow chart illustrating an example of the procedure to be executed after the completion of inspections.
Figure 9:
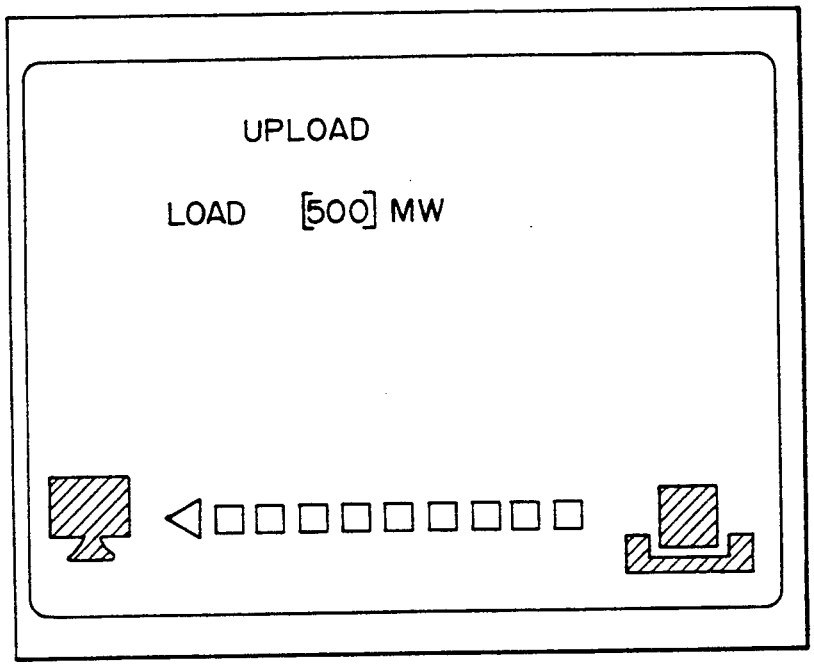
FIG. 9 shows an example of a display image on the interactive equipment after the completion of inspections.

Then, the facility management processing means 15 of the processor 1 instructs the data reception means 17 to start receiving the inspection data from the portable terminal equipment 2 (step 301), as shown in FIG. 8. The data reception means 17 instructs the portable terminal equipment 2 to start sending the inspection data so that the control means 21 operates to transmit the present inspection status quantities stored in the data memory 23 to the processor 1 via the transfer means 25. The data reception means 17 operates to store the received inspection status quantities in the data base means 11 in a predetermined data format. In this case, as shown in FIG. 9, there is displayed on the interactive apparatus 4 the data transfer status from the portable terminal equipment 2 to the processor 1 (step 302).

After the completion of data transfer, the facility management processing means 15 reads the inspection data from the data base means 11 (step 303). The facility management processing means 15 compares the process status quantity with a limit value for each inspection item, and if the comparison results indicate an abnormal state, it generates the data indicating to display such an effect (steps 304 and 305). If the comparison results do not indicate an abnormal state, it skips step 305 and generates the data indicating to display the inspection results (step 306). In this manner, the inspection results such as shown in FIG. 10 are displayed as a list on the display device 4a of the interactive apparatus 4.

In this list, the inspection result display date is displayed in a column R1, the inspection data is displayed in a column R2, an inspection route is displayed in a column R3, the maintenance engineer identification code is displayed in a column R4, the maintenance engineer name is displayed in a column R5, and the load value is displayed in a column R6. In an area under these columns occupying most of the list, there are displayed the inspection results in the order following the inspection route.

If the maintenance engineer instructs to print out an inspection report by using the interactive apparatus 4, the facility management processing means 15 reads the second and first previous inspection data and the present inspection data from the data base means 11 and outputs the data to the interactive control means 14. Then, the interactive control means 14 operates to generate the inspection report data in a predetermined format and to output it to the printer 5. As a result, an inspection report such as shown in FIG. 11 is printed out by the printer 5.

Figure 12:
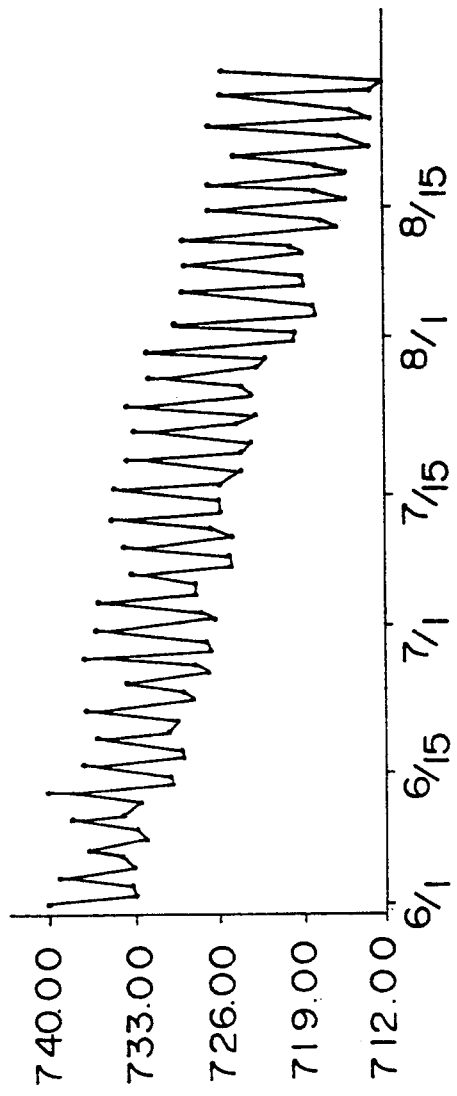
FIG. 12 is a historical graph showing an example of a change with time of inspection results.
Figure 13:
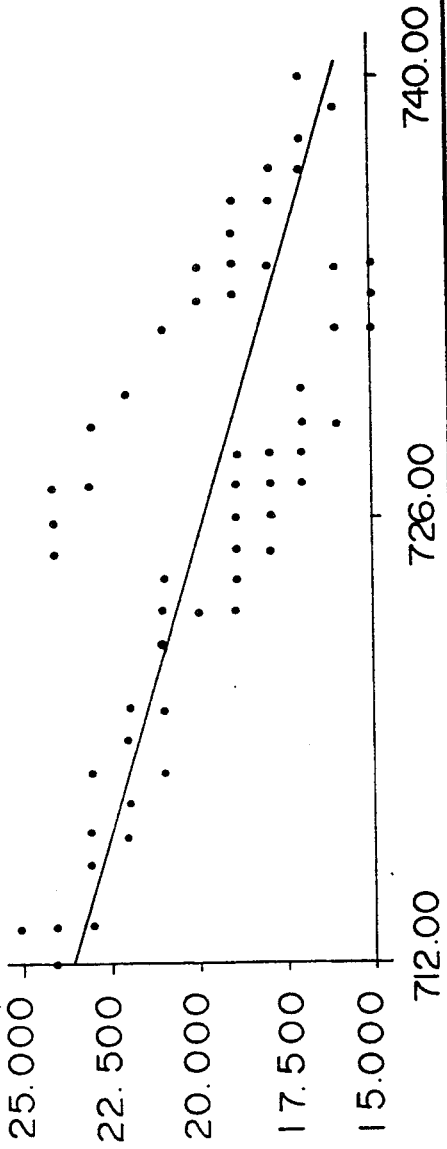
FIG. 13 is a historical graph showing an example of a correlation graph of inspection results.

Similarly, the interactive control means 14 operates to cause the printer 5 to print out a graph indicating a change with time of the degradation of each facility such as shown in FIG. 12 and a correlation graph indicating a correlation between two inspection items, respectively referring to the past inspection data stored in the data base means 11.

Similarly, an inspection report showing the inspection results during a designated period may also be printed out.

As described above, according to the present embodiment, the portable terminal equipment 2 stores the apparatus name, limit value, and previous value, respectively at each field on an inspection route. In accordance with the display contents on the display device 26, a maintenance engineer moves along the inspection route to inspect each facility and enter data, thus considerably reducing the burden on the maintenance engineer.

Furthermore, the entered data is stored in the data base means 11, the capacity for storing the inspection data can be considerably reduced. Still further, various types of reports can be easily formed by using the stored data, thus improving the handling performance.

Figure 14:
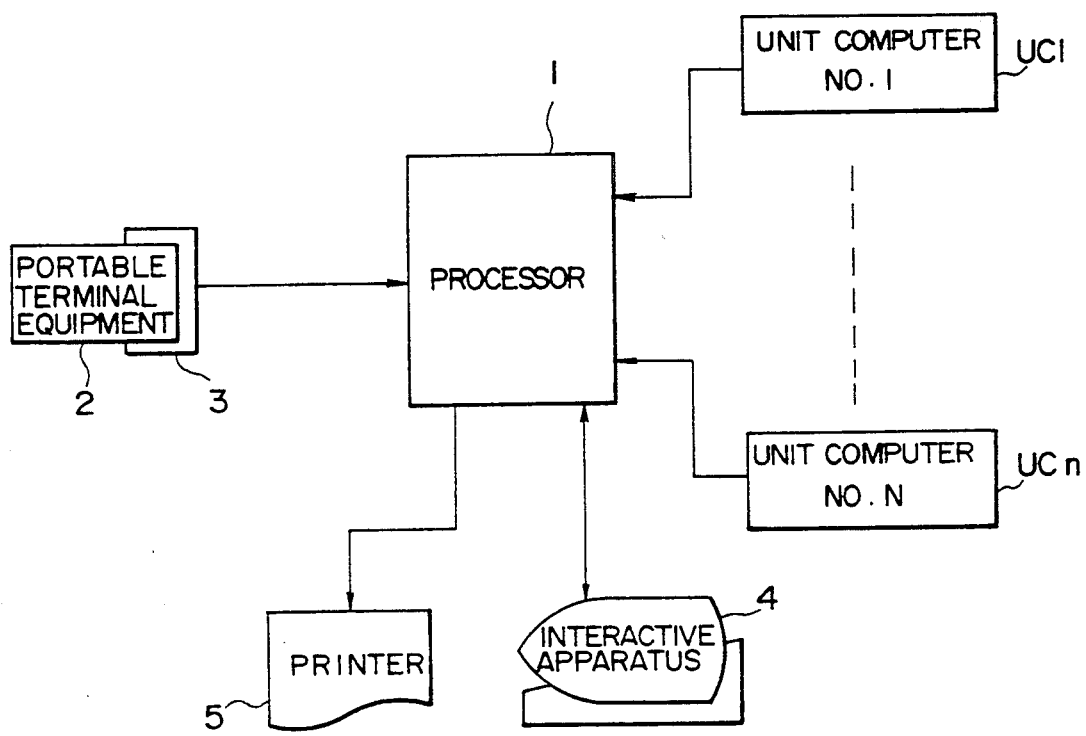
FIG. 14 is a block diagram showing a modification of the facility inspection support apparatus shown in FIG. 1.

FIG. 14 shows the facility inspection support apparatus according to another embodiment of the present invention.

In this embodiment, the processor 1 is connected on-line to a plurality of unit computers UC1 to UCn each controlling to run and monitor the corresponding one of a plurality of plants Nos. 1, 2, ..., n. The process status quantities necessary for facility management are also inputted from each unit computer UC1 to UCn.

In this embodiment, therefore, the amount of motion by a maintenance engineer can be further reduced. Furthermore, since the process status quantities for the power plant can be inputted and managed as desired, a facility collective inspection support apparatus can be realized.

Another embodiment will be described which is constructed such that a patrol inspection course can be automatically set by designating an object of patrol inspection.

Figure 15:
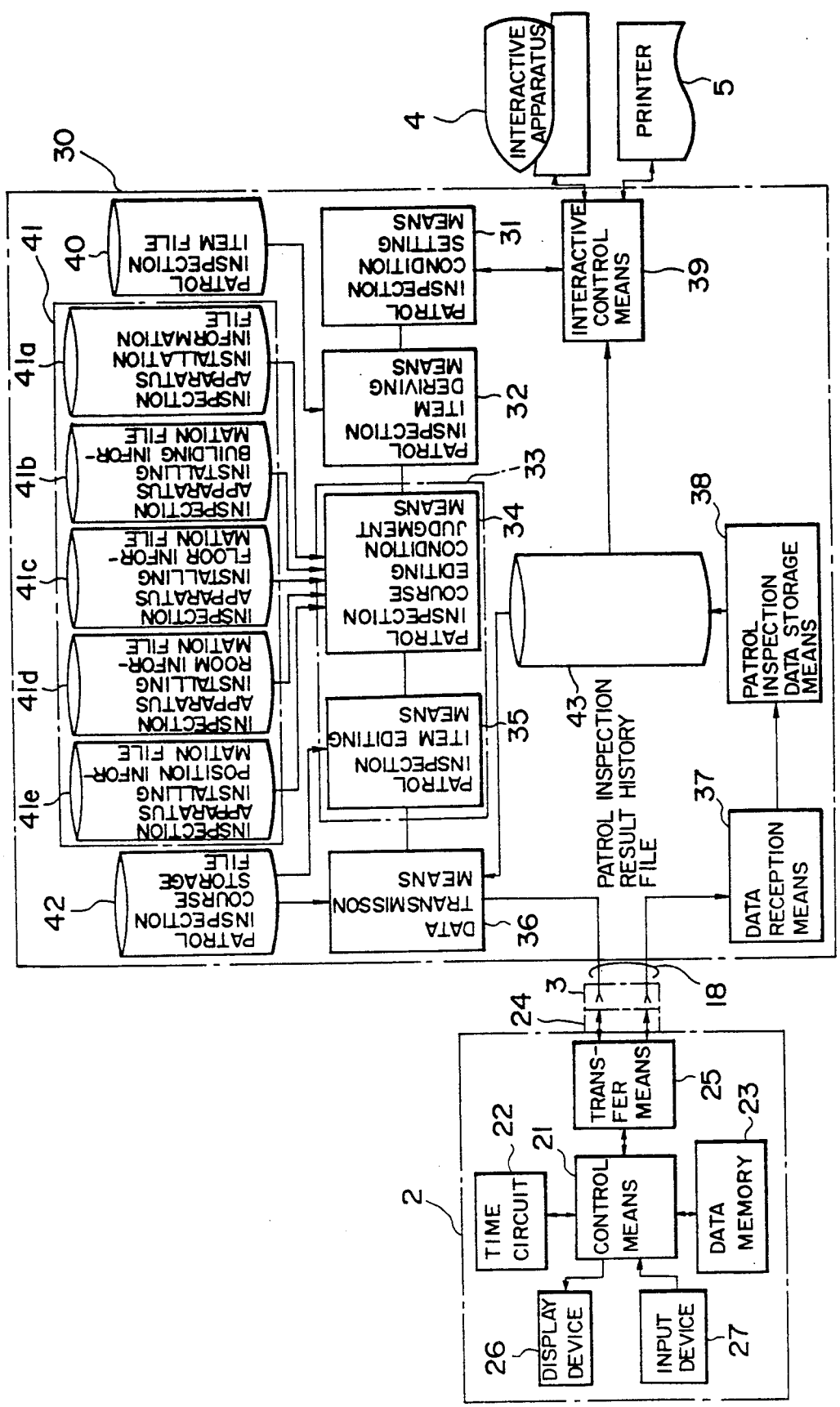
FIG. 15 is a block diagram showing a facility inspection support apparatus according to another embodiment of the present invention.

In this embodiment shown in FIG. 15, a processor 30 is used in cooperation with the portable terminal equipment 2. The processor 1 is constructed of: a patrol inspection condition setting means 31 for receiving a patrol inspection condition set by a maintenance engineer (operator) and analyzing and setting it; a patrol inspection item deriving means 32 for deriving an object patrol inspection item from a patrol inspection condition set by the patrol inspection condition setting means 31; a patrol inspection course editing means 33 being constructed of patrol inspection course editing condition judgment means 34 and a patrol inspection item editing means 35, the patrol inspection course editing condition judgment mean 34 discriminating a condition by which a derived patrol inspection item is edited into an optimum patrol inspection course, and the patrol inspection item editing means 35 editing a derived patrol inspection item in accordance with a condition discriminated by the patrol inspection course editing condition judgment means 34; a data transmission means 36 for transmitting the edited patrol inspection course and previous inspection data to the portable terminal equipment 2 via the communication device 3; a data reception means 37 for receiving the patrol inspection results from the portable terminal equipment 2 via the communication device 3; a patrol inspection data storage means 38 for storing the patrol inspection results as a history data; an interactive control means 39 for displaying the patrol inspection results on the interactive apparatus in the form of a graph or a list; a patrol inspection item file 40 for storing the patrol inspection item; a patrol inspection apparatus information file 41 for storing the information regarding a patrol inspection apparatus; a patrol inspection course storage file 42 for storing an edited patrol inspection course; and a patrol inspection history file 43 for storing the patrol inspection results.

The patrol inspection apparatus information file 41 is constructed of: an inspection apparatus installation information file 41a for storing installation information of patrol inspection apparatuses; a patrol inspection apparatus building information file 41b for storing the information of the building having a patrol inspection apparatus; a patrol inspection apparatus installation floor information file 41c for storing the information of a floor having a patrol inspection apparatus, a patrol inspection apparatus room information file 41d for storing the information of a room having a patrol inspection apparatus; and a patrol inspection apparatus position information file 41e for storing the information of a position of a patrol inspection apparatus.

Figure 16:
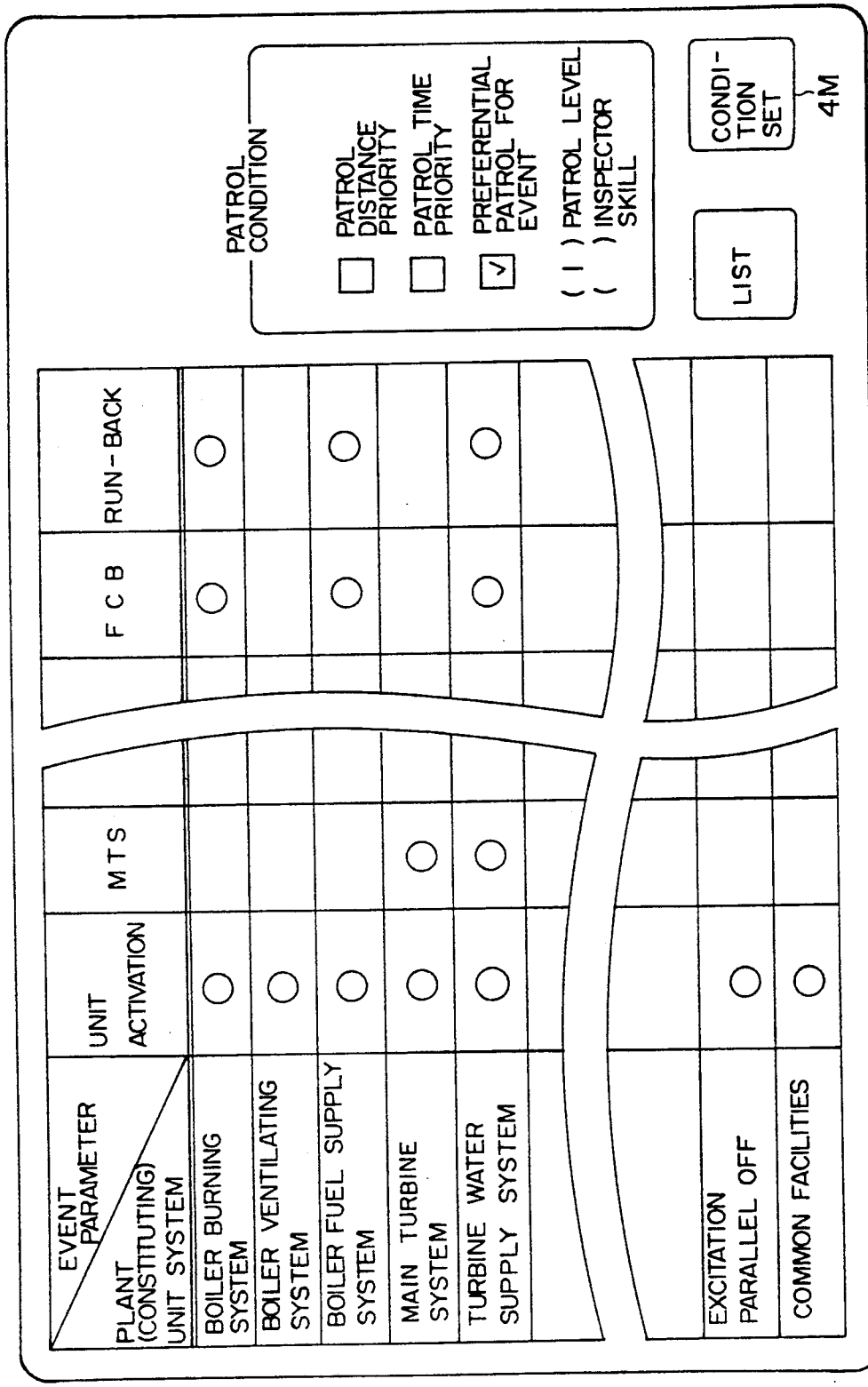
FIG. 16 shows an example of a display image indicating patrol inspection conditions to be selected for the execution of patrol inspections using the apparatus shown in FIG. 15.

Before executing a patrol inspection, the patrol inspection condition setting means 31 displays on the display device 4a of the interactive apparatus 4 a patrol inspection condition selection menu such as shown in FIG. 16 for urging a maintenance engineer to set a patrol inspection condition. This menu in the form of list displays plant constituting apparatus such as a boiler burning system and a boiler ventilating system to be patrol inspected, relative to event parameters such as unit activation, master trip solenoid (MTS), and fast cut-back (FCB). While reviewing this menu, a maintenance engineer enters a plant constituting apparatus system to be patrol inspected in accordance with the present inspection object. For example, if the object of a present inspection is MTS, it becomes necessary to patrol inspect the main turbine system and the turbine water supply system by all means. Therefore, the main turbine system and turbine water supply system are entered and set as the plant constituting apparatus systems for patrol inspection. Obviously, this setting can be automatically entered. In this case, other systems judged empirically as necessary, are manually entered and set.

Next, as an inspection condition, either a patrol distance priority or a patrol time priority is selected. In addition, it is judged whether the plant apparatus of the system is to be selectively and preferentially inspected or not, in accordance with the event. If a preferential inspection is to be carried out, the inspection level is set to a desired value. A maintenance engineer skill degree is also set, which degree determines to which extent the contents of the patrol support information displayed on the display device 26 of the portable terminal equipment 2 are displayed in detail. Lastly, a condition setting area 4M on the menu is touched so that the patrol inspection condition setting means 31 causes the setting conditions to be stored and supplied to the patrol inspection item deriving means 32.

In accordance with the inspection conditions and plant constituting apparatuses set by the patrol inspection condition setting means 31, the patrol inspection item deriving means 32 derives an object patrol inspection item from the patrol inspection item file 40 prepared for each apparatus in the plant.

FIG. 17 shows an example of the contents of the patrol inspection item file 40 for the turbine main system. This patrol inspection item file 40 includes: an item ID for discriminating an inspection item, an inspection item name, an inspection apparatus number for discriminating an apparatus to be inspected, and event parameter and importance factor defining the inspection item is required by which event parameter (patrol object). For example, in setting a patrol inspection condition it is assumed that "MTS" is selected as the patrol inspection object (event parameter) and "main turbine system" is selected as the object to be inspected (plant constituting apparatus system). Then, the patrol inspection item deriving means 32 derives only those inspection items not indicated by "NUL" within the event parameter MTS field, from the patrol inspection item file 40 for the main turbine system shown in FIG. 17. "NUL" means that it is not necessary to be inspected. Also in setting a patrol inspection condition, if a preferential patrol for a particular event parameter and a priority level are designated as the patrol inspection conditions, inspection items equal to or lower than the designated priority level are omitted, and if a patrol maintenance engineer skill degree is designated, inspection items equal to or lower than the designated skill degree are omitted. In judging the priority level, the priority level in an event parameter field in the file 40 shown in FIG. 17 is compared with the priority level designated by the patrol maintenance engineer.

For example, in setting a patrol inspection condition using the menu shown in FIG. 16, if the preferential patrol inspection and the patrol inspection level "1" are set, the patrol inspection items to be derived from the patrol inspection item file 40 include the item corresponding to the inspection apparatus No. "3" for the inspection of "Turbine Protect Relay Panel Status" T002, and the item corresponding to the inspection apparatus No. "4" for the inspection of "Turbine Top Display Status".

In FIG. 17 MFT means a master fuel trip, and EHC means an electro hydraulic control.

In accordance with the patrol inspection set by the patrol inspection condition setting means 31 on the basis of the patrol inspection item derived by patrol inspection item deriving means 32, the patrol inspection course editing condition judgment means 34 judges an edit condition for editing an optimum patrol inspection course. In accordance with the judged results, the patrol inspection item editing means 35 edits a patrol inspection course.

Figure 18B:
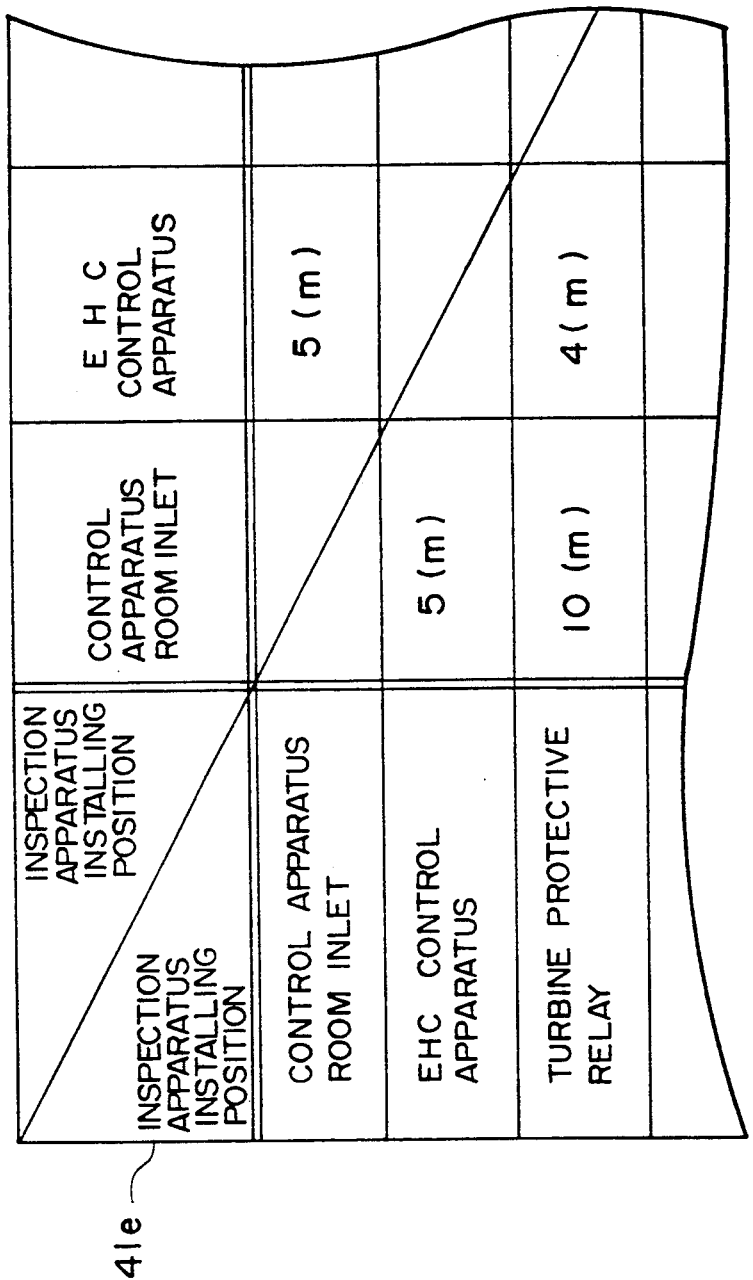
Figure 18C:
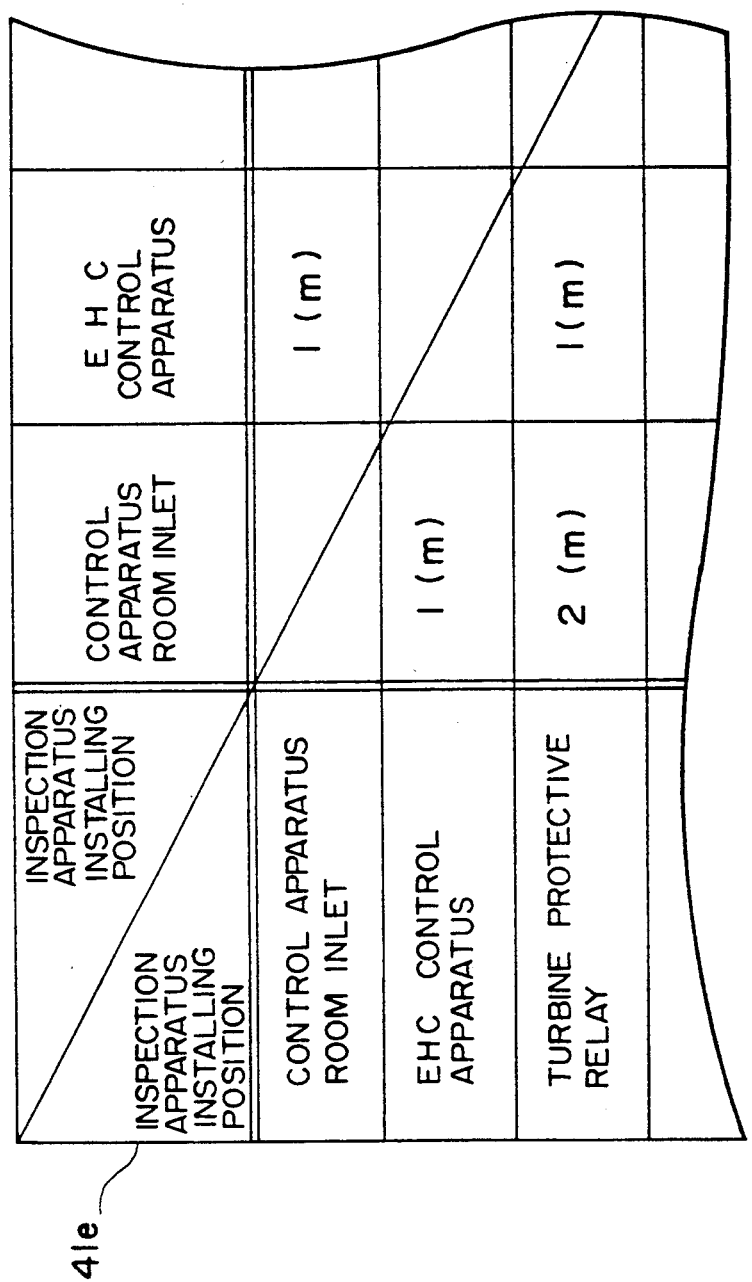

FIG. 18A shows an example of a patrol inspection apparatus installation information table stored in the inspection apparatus installation information file 41a. FIGS. 18B and 18C show examples of a patrol inspection apparatus installation inter-position distance information table and a patrol inspection apparatus installation inter-position time information table, respectively stored in the inspection apparatus installation position information file 41e.

The inspection apparatus installation building information file 41b, inspection apparatus installation floor information file 41c, and inspection apparatus installation room information file 41d are constructed similarly to the patrol inspection apparatus installing inter-position distance information table of FIG. 18B and the patrol inspection apparatus installing inter-position time information table of FIG. 18C.

If the "patrol distance priority" is selected as the patrol inspection condition, the patrol inspection course editing condition judgment means 34 picks up all inspection apparatus numbers in FIG. 17 and the installation information for the object inspection apparatuses from the patrol inspection apparatus installation information table shown in FIG. 18A, in accordance with the inspection item data derived by the patrol inspection item deriving means 32. In accordance with the derived information, the distance between buildings, the distance between floors in each building, the distance between rooms on each floor, and the distance between positions having inspection apparatuses in each room, are derived from the patrol inspection apparatus installation inter-position distance information table shown in FIG. 18, to thereby determine a patrol route having the shortest patrol distance.

For example, it is assumed that the patrol inspection item deriving means 32 picks up the patrol inspection items such as the inspection apparatus Nos. 1, 2, 3 and the like shown in FIG. 17. The patrol inspection course editing condition judgment means 34 identifies, while referring to FIG. 18A, the buildings, floors, and rooms of the inspection apparatuses to obtain shortest inspection paths between buildings, floors, and rooms. Thereafter, the patrol inspection course editing condition judgment means 34 determines the shortest path for the inspection apparatuses in the same room, while referring to FIG. 18B. Specifically, since the inspection apparatuses Nos. 2 and 3 are installed in the same control apparatus room on the floor 3F, both of the apparatuses are considered as an integral object. The total distance of respective patrol paths is calculated from FIG. 18B to thereafter determine the route having the shortest distance.

In accordance with the determined inspection route, the patrol inspection item editing means 35 rearranges the inspection items and stores them in the patrol inspection course storage file 42. The data transmission means 36 picks up the edited patrol inspection course from the patrol inspection course storage file 42. At the same time, in order to provide a reference to a patrol inspection abnormal judgment, the previous patrol inspection results (values at the previous abnormal mode) obtained under the same patrol object (event parameter) as the present one are picked up from the patrol inspection result history file 43, and transmitted via the communication device 3 to the portable terminal equipment 2.

The portable terminal equipment 2 receives via the transfer means 25, the patrol inspection course and previous inspection results transmitted from the processor via the transfer device 3. The control means 21 displays the received patrol inspection items and previous inspection data on the display device 26, if desired. The previous values are used as a reference data for inspections (for judgment of an abnormal value by comparison with the previous value). In accordance with the patrol inspection item displayed on the display device 26, the inspector performs inspection jobs and enters the inspection results from the input device 27. When inspection jobs for all patrol inspection items are completed, the patrol inspection result data is transmitted to the processor 30 via the transfer means 25 and communication device 3.

After the completion of patrol inspection jobs, the processor 30 receives at the data reception means 37 the patrol inspection result data from the portable terminal equipment 2 via the communication device 3. The patrol inspection data storage means 38 stores the received inspection data in the patrol inspection result history file 43. In storing the inspection result data, not only the inspection result data but also the patrol inspection object and the like are stored as an inspection result data header so as to facilitate data retrieval.

Figure 19:
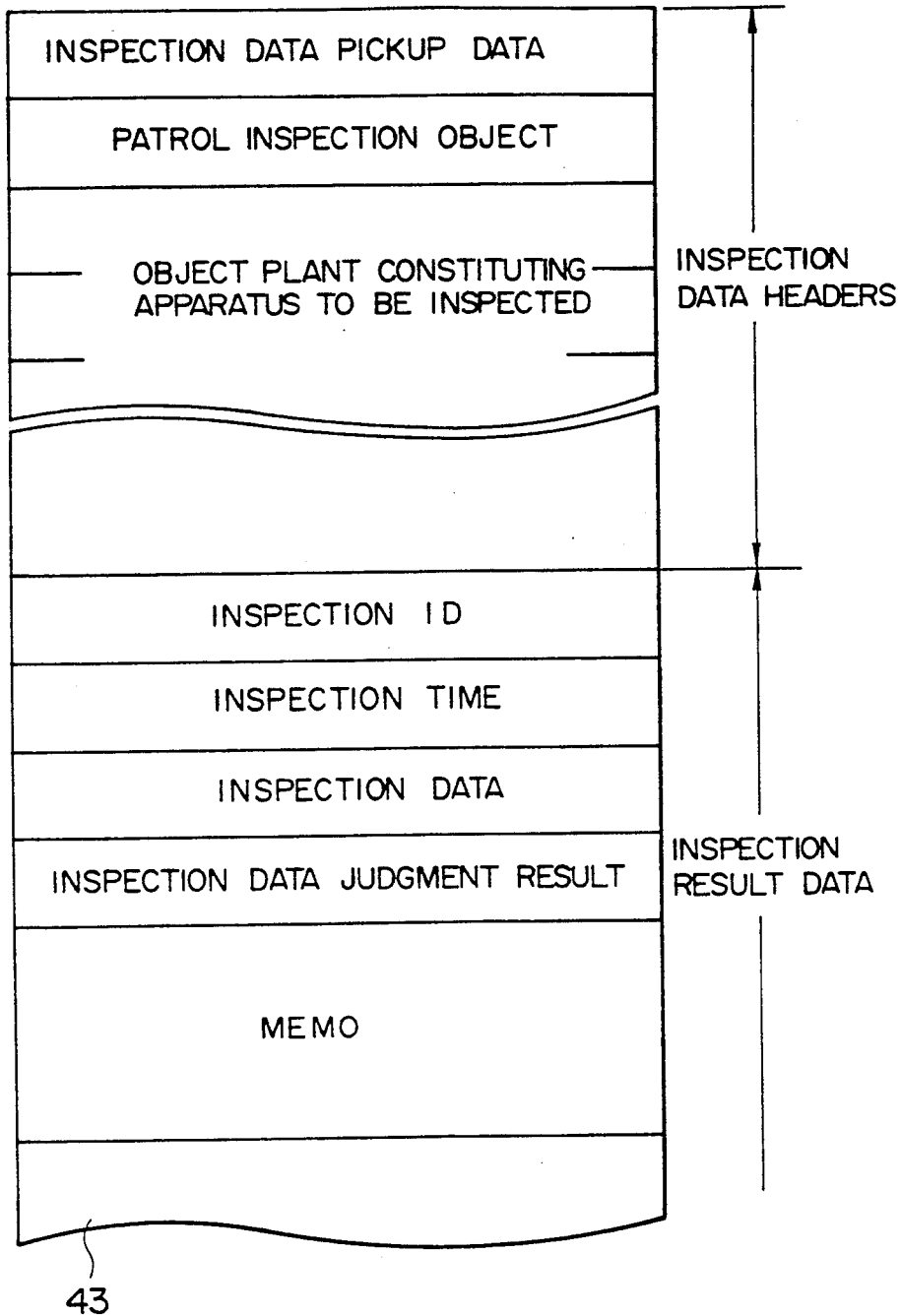
FIG. 19 shows an example of a patrol inspection result history file.

FIG. 19 shows an example of the format of stored inspection result data. As the inspection result data header, an inspection data pickup data, patrol inspection object, plant constituting apparatus to be inspected, and the like are stored. Therefore, these header fields can be used as search key for easy data retrieval. The patrol inspection results derived from the patrol inspection course editing means 33 by the interactive control means 39 are displayed on the display device 4a of the interactive apparatus 4 as a list of inspection results, a list of abnormal items, a graph of history data, and the like.

As described above, if a patrol inspection condition is given, the patrol inspection items are selectively derived so as to obtain an optimum patrol inspection course most suitable for the inspection object. Furthermore, if a patrol inspection method for a particular inspection object is designated, it is possible to set a patrol inspection course while considering the inspection paths which results in a most efficient patrol inspection job procedure without any loss of inspection distances and time.

In the above embodiment, an inspector dynamically sets a patrol item and effectively sets a patrol course. Instead, the patrol inspection condition setting means of the embodiment may receive an event occurrence signal from a plant to detect an occurrence of an event (such as at the time of starting a plant or upon occurrence of an accident), thereby enabling the automatic setting of an inspection item.

Furthermore, in the above embodiment, a patrol inspection item is dynamically set in accordance with an event of a plant. Such dynamic setting may also be carried out for a regular patrol inspection generally executed.

Still further, the patrol inspection item deriving means 32 may derive the previous data from the patrol inspection result history file 43 to consider it in determining the present inspection item.

We claim:

1. A facility inspection support apparatus, comprising:
portable terminal equipment for collecting a patrol inspection result data at each site of plant facilities, a processor for receiving said patrol inspection result data collected by said portable terminal equipment and performing a necessary data process, and an interactive apparatus for displaying, upon request, said patrol inspection result data processed by said processor, and for interactively selecting a necessary patrol inspection route from a predetermined plurality of patrol inspection routes,
said processor including data base means for storing in advance said predetermined plurality of patrol inspection routes, and discrimination information of patrol inspection items included in the inspection routes, and storing said patrol inspection result data collected by said portable terminal equipment, and facility management processing means for deriving said discrimination information for one of said patrol inspection items designated by said interactive apparatus and a past patrol inspection result data for said one of said patrol inspection items, out of said data base means, and transferring said discrimination information and said past patrol inspection result data to said portable terminal equipment, and
said portable terminal equipment including a data memory for storing said collected patrol inspection result data, and a display device for sequentially displaying said discrimination information of patrol inspection items and said past patrol inspection result data sent from said processor in the order following said patrol inspection route.

2. A facility inspection support apparatus according to claim 1, wherein said interactive apparatus includes a display and a keyboard.

3. A facility inspection support apparatus according to claim 1, wherein said processor is connected to a printer.

4. A facility inspection support apparatus according to claim 3, wherein said facility management processing means transfers said patrol inspection result data to and from said portable terminal equipment via a data transmission means and a data reception means, interactively processes said patrol inspection result data between said interactive apparatus and said printer via an interactive control means, and issues a command to said data base means for reading and writing said patrol inspection result data and performing an interactive control operation.

5. A facility inspection support apparatus according to claim 1, wherein said portable terminal equipment is provided with a timer circuit operating to add a current time data to an inputted patrol inspection result data.

6. A facility inspection support apparatus according to claim 1, wherein said processor is connected on-line to a plurality of unit computers, each of said unit computers controlling to run and monitor a corresponding one of a plurality of plants, wherein process status quantities necessary for a facility management operation are inputted from each of said unit computers.

7. A facility inspection support apparatus comprising:
portable terminal equipment for collecting patrol inspection result data at each site of plant facilities, and a processor for receiving said patrol inspection result data collected by said portable terminal equipment and determining an optimum patrol inspection course form a predetermined plurality of patrol inspection courses,
said processor including means for setting a patrol inspection condition, means for deriving an object patrol inspection item from a patrol inspection item file in accordance with said set patrol inspection condition, means for editing said derived patrol inspection item in an optimum patrol inspection course satisfying a patrol object and storing said optimum patrol inspection course in a patrol inspection course storage file, means for storing said patrol inspection result data received from said portable terminal equipment in a patrol inspection result history file, and means for displaying said stored patrol inspection result data, and
said portable terminal equipment including means for receiving patrol inspection course information sent from said processor, means for sequentially displaying said received patrol inspection item, means for inputting a patrol inspection result data regarding said displayed patrol inspection item, and means for transmitting said inputted patrol inspection result data to said processor.

8. A facility inspection support apparatus according to claim 7, wherein said storing means includes means for deriving a condition for editing said derived patrol inspection item to said optimum patrol inspection course, and means for editing said derived patrol inspection item in accordance with said edit condition determined by said condition deriving means.

9. A facility inspection support apparatus according to claim 7, wherein said processor is connected to a printer.

10. A facility inspection support apparatus according to claim 7, wherein said portable terminal equipment is provided with a timer circuit operating to add a current time data to an inputted patrol inspection result data.

11. A facility inspection support apparatus according to claim 5, further comprising a patrol inspection apparatus information file, wherein said patrol inspection apparatus information file comprises an inspection apparatus installation information file for storing installation information related to a patrol inspection apparatus, a patrol inspection apparatus building information file for storing information related to a building having said patrol inspection apparatus, a patrol inspection apparatus installation floor information file for storing information related to a floor having said patrol inspection apparatus, a patrol inspection apparatus room information file for storing information related to a room having said patrol inspection apparatus, and a patrol inspection apparatus position information file for storing information related to a position of said patrol inspection apparatus.

12. A facility inspection support apparatus according to claim 7, wherein said patrol inspection item file comprises an item identity for discriminating an inspection item, and inspection item name, and an inspection apparatus number for discriminating an apparatus to be inspected.

* * * * *